United States Patent
Wu et al.

(10) Patent No.: US 10,711,598 B2
(45) Date of Patent: Jul. 14, 2020

(54) METHODS TO SYNCHRONIZE SIGNALS AMONG ANTENNAS WITH DIFFERENT CLOCK SYSTEMS

(71) Applicant: Halliburton Energy Services, Inc., Houston, TX (US)

(72) Inventors: Hsu-Hsiang Wu, Sugar Land, TX (US); Matthew Chase Griffing, Kingwood, TX (US); Christopher Golla, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 90 days.

(21) Appl. No.: 15/779,461

(22) PCT Filed: Jun. 27, 2017

(86) PCT No.: PCT/US2017/039570
§ 371 (c)(1),
(2) Date: May 25, 2018

(87) PCT Pub. No.: WO2019/005018
PCT Pub. Date: Jan. 3, 2019

(65) Prior Publication Data
US 2019/0376383 A1    Dec. 12, 2019

(51) Int. Cl.
*E21B 47/12* (2012.01)
*G01V 3/12* (2006.01)
*G01V 13/00* (2006.01)

(52) U.S. Cl.
CPC .............. *E21B 47/12* (2013.01); *G01V 3/12* (2013.01); *G01V 13/00* (2013.01); *G01V 2200/12* (2013.01)

(58) Field of Classification Search
CPC . E21B 47/12; G01V 3/00; G01V 3/12; G01V 2200/12; G01V 2200/16; G01V 13/00
See application file for complete search history.

(56) References Cited

U.S. PATENT DOCUMENTS

| 2003/0132751 A1 | 7/2003 | Stolarczyk |
| 2010/0225323 A1* | 9/2010 | Tabarovsky ............. G01V 3/28 324/341 |

(Continued)

FOREIGN PATENT DOCUMENTS

WO    WO-2017/105885    *    6/2017

OTHER PUBLICATIONS

International Search Report and Written Opinion for PCT Application No. PCT/US2017/039570, dated Dec. 19, 2017.

*Primary Examiner* — Catherine T. Rastovski
(74) *Attorney, Agent, or Firm* — Locke Lord LLP

(57) ABSTRACT

A method for synchronizing signals among transmitters and receivers of a logging tool positioned in a borehole is provided. Measurement signals generated from operating a transmitter in the borehole are acquired by a receiver. An operating frequency of the receiver is determined by a processing unit. The operating frequency of the receiver is different from an operating frequency of the transmitter. A sampling frequency of the receiver is determined based on the determined operating frequency. A phase delay of the receiver is determined by the processing unit. The acquired measurement signals are adjusted by the processing unit based on the determined sampling frequency and the phase delay of the receiver.

20 Claims, 14 Drawing Sheets

(56) References Cited

U.S. PATENT DOCUMENTS

| | | |
|---|---|---|
| 2011/0251813 A1 | 10/2011 | Coman et al. |
| 2012/0046868 A1 | 2/2012 | Tchakarov et al. |
| 2012/0163523 A1 | 6/2012 | Tang |
| 2014/0192621 A1 | 7/2014 | Ram et al. |
| 2016/0032714 A1* | 2/2016 | Rao .................. E21B 47/12 340/855.4 |
| 2017/0328198 A1* | 11/2017 | Van Der Ende ...... E21B 47/122 |
| 2018/0059280 A1* | 3/2018 | Hartmann ................ G01V 3/30 |

* cited by examiner

METHODS TO SYNCHRONIZE SIGNALS AMONG ANTENNAS WITH DIFFERENT CLOCK SYSTEMS

CROSS REFERENCE TO RELATED APPLICATIONS

This application is the U.S. National Stage of PCT International Application No. PCT/US2017/039570, filed Jun. 27, 2017, the entire disclosure of which is hereby incorporated herein by reference in its entirety.

TECHNICAL FIELD OF THE INVENTION

The embodiments disclosed herein generally relate to apparatus and methods for making measurements related to oil and gas exploration and, more particularly, to methods to synchronize signals among antennas with different clock systems.

BACKGROUND OF THE INVENTION

Performing measurements on fluid samples is desirable in many oil industry applications. Various methods exist for performing downhole measurements of petrophysical parameters of a geologic formation. Logging may be used in wellbores to make, for example, formation evaluation measurements to infer properties of the formations surrounding the borehole and the fluids in the formations. Typical logging tools may include electromagnetic (resistivity) tools, nuclear tools, acoustic tools, and nuclear magnetic resonance (NMR) tools, though various other types of tools for evaluating formation properties (also referred to as "formation parameters") are also available. Early logging tools were run into a wellbore on a wireline cable after the wellbore had been drilled. Modern versions of such wireline tools may still be used extensively. However, as the demand for information while drilling a borehole continued to increase, measurement-while-drilling (MWD) tools and logging-while-drilling (LWD) tools have since been developed. MWD tools may typically provide drilling parameter information such as weight on the bit, torque, temperature, pressure, direction, and inclination. LWD tools may typically provide formation evaluation measurements such as resistivity, porosity, NMR distributions, and so forth. MWD and LWD tools may have characteristics common to wireline tools (e.g., transmitting and receiving antennas, sensors, etc.), but may be designed and constructed to endure and operate in the harsh environment of drilling.

The depth of detection provided by the logging tool is directly proportional to the distance between the transmitter and the receiver. As a result, most of the deep reading tools have very large distance between them. The LWD very deep resistivity basic tool configuration typically includes two or more independent drilling subs (one transmitter and one or more receivers) that are placed in a bottom hole assembly (BHA) among other drilling tools to allow large transmitter-receiver spacing. The basic measurements obtained with this tool consist of induction amplitudes at various frequencies, in order to allow detection of various formation layer boundaries with resistivity contrasts having a wide range of resistivities.

Multiple subs typically can communicate over a synchronous bus. Synchronous buses include a clock in the control lines and a fixed protocol for communicating that is relative to the clock. Synchronous buses have two disadvantages, however. First, the conventional wisdom is that every device on a bus must run at the same clock rate. Second, because of clock skew, distortion, and delay that can result from many factors, including line impedance, synchronous buses cannot be very long if they are high frequency. Therefore, it is very challenging for a synchronous sub bus to synchronize measurements over a long distance. Proper synchronization is desirable for getting good measurements and for avoiding undesired amplitude/phase measurement errors.

At least some of the ultra-deep reading tools that have been used by the industry achieve multi-coupling LWD measurements by a tilted antenna design. Special processing schemes in complex domain (consisting of real and imaginary part) are typically required to compensate such measurements and acquire signals with special sensitivity. As known in the art, there are various signal processing schemes to acquire LWD signals for various applications. However, since time synchronization errors impact measurement accuracy, the fundamental requirement for multi-antenna based tools is the complete and precise time synchronization of the tool to a single common reference time, and this becomes increasingly more challenging for longer antenna separation.

The ability to mitigate the effects of synchronization errors is of direct relevance to ultra-deep logging tools, particularly for real-time processing of measurements. Accordingly, there is continued interest in the development of calibration schemes capable of resolving synchronization issues.

BRIEF DESCRIPTION OF THE SEVERAL VIEWS OF THE DRAWING

For a more complete understanding of the disclosed embodiments, and for further advantages thereof, reference is now made to the following description taken in conjunction with the accompanying drawings in which.

DETAILED DESCRIPTION OF THE DISCLOSED EMBODIMENTS

Figure 1:
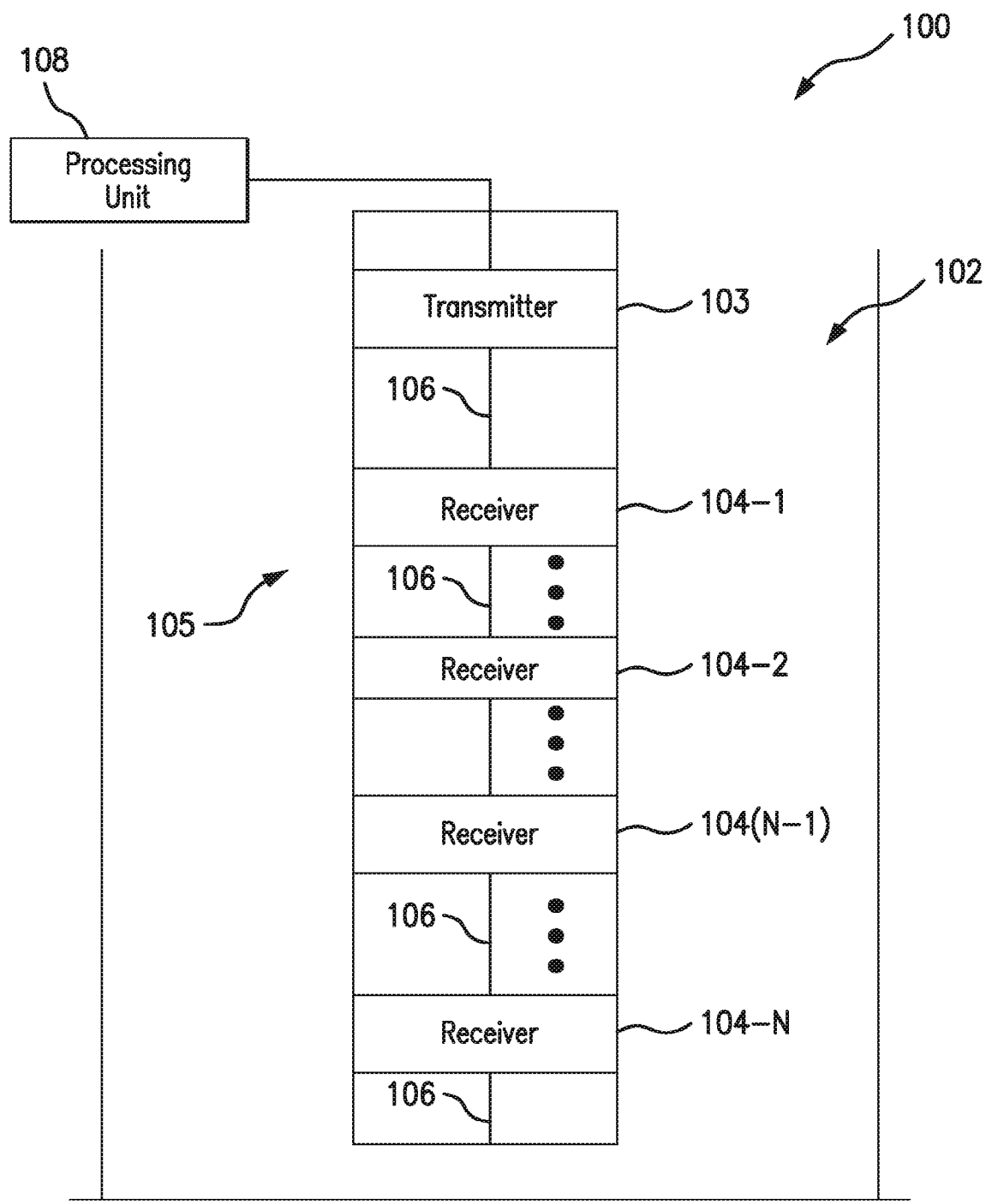
FIG. 1 illustrates a block diagram of an embodiment of an apparatus having a processing unit and a tool to determine formation properties downhole in a well.

The following discussion is presented to enable a person skilled in the art to make and use the invention. Various modifications will be readily apparent to those skilled in the art, and the general principles described herein may be applied to embodiments and applications other than those detailed below without departing from the spirit and scope of the disclosed embodiments as defined herein. The disclosed embodiments are not intended to be limited to the particular embodiments shown, but are to be accorded the widest scope consistent with the principles and features disclosed herein.

The term "uphole" as used herein means along the drill string or the hole from the distal end towards the surface, and "downhole" as used herein means along the drill string or the hole from the surface towards the distal end.

It will be understood that the term "oil well drilling equipment" or "oil well drilling system" is not intended to limit the use of the equipment and processes described with those terms to drilling an oil well. The terms also encompass drilling natural gas wells or hydrocarbon wells in general. Further, such wells can be used for production, monitoring, or injection in relation to the recovery of hydrocarbons or other materials from the subsurface. This could also include geothermal wells intended to provide a source of heat energy instead of hydrocarbons.

The present inventors have recognized, among other things, that current methods of measuring formation properties using ultra-deep logging tools introduce synchronization errors when multiple antennas with different clock systems are utilized. Ultra-deep depth of investigation may correspond, for example, to a depth of investigation of about 20-300 feet.

Apparatus and methods are described below, such as for synchronizing signals among antennas when receiving real-time electromagnetic measurements. Various embodiments of the present invention relate generally to novel in-situ calibration schemes capable of directly resolving synchronization issues. A tool or tool structure having at least one downhole transmitter sub and a plurality of axially spaced downhole receiver subs can transmit and receive multiple signals in real time. The tool is integrated with or operatively connected to a processing unit configured to determine sampling frequency and phase delay of each receiver and configured to process the acquired measurement signals using the determined sampling frequency and the phase delay of a corresponding receiver. Advantageously, embodiments of the present invention do not require a bus interconnection between the subs to perform synchronization among antennas over a long distance. Instead, the following will describe, in detail, several processing schemes to achieve relative synchronization among the subs and further adjustment of the received signals to compensate the effect of non-synchronization. In one embodiment, the synchronized measurements can be performed by taking into account relative clock information among antennas.

To facilitate a better understanding of the present disclosure, the following examples of certain embodiments are given. In no way should the following examples be read to limit, or define, the scope of the disclosure. Embodiments of the present disclosure and its advantages are best understood by referring to FIGS. 1 through 14, where like numbers are used to indicate like and corresponding parts.

Turning now to the drawings, FIG. 1 shows a block diagram of an embodiment of an apparatus 100 having a processing unit 108 and a tool or tool structure 105 to determine formation properties downhole in a well 102. Tool 105 has an arrangement of a transmitter sub 103 and a plurality of axially spaced downhole receiver subs integrated with receivers 104-1, 104-2 . . . 104-(N−1), 104-N (also referred to collectively as "receivers subs 104" or simply "receivers 104") to operate in conjunction with processing unit 108 to acquire real-time signals generated by the transmitter 103. In one embodiment, distance between the receivers 104-1, 104-2 . . . 104-(N−1), 104-N may range from approximately 10 ft to approximately 300 ft. The receivers 104 acquire measurements of formation parameters, as described in greater detail below. Equivalent, similar, or identical control and processing arrangements of transmitters and receivers, as disclosed in various embodiments herein, provide a mechanism for synchronizing signals when the transmitter 103 and receivers 104 have different clock systems.

In an embodiment, an arrangement of the transmitter sub 103 and receiver subs 104 can operate in conjunction with processing unit 108 to provide various formation property measurements. Transmitter sub 103 and receiver subs 104 can be interconnected by a bus 106. Each sensor element (i.e., transmitters and receivers) in the illustrated arrangement can be realized as a coil element, a wire element, a toroidal element, a solenoid element, an electrode type element, a transducer, or other appropriate electromagnetic based sensor. The selected sensors may operate in various frequency ranges. The transmitter antenna 103 can employ alternating currents to generate an electromagnetic field, which can induce eddy current in the surrounding region. The eddy current can generate a magnetic field that can be detected by the receiver antennas 104 in the logging tool 105.

As shown in FIG. 1, the transmitter 103 and each receiver 104-1, 104-2 . . . 104-(N−1), 104-N are preferably arranged at a different position along the longitudinal axis of the logging tool 105. Multiple receivers 104 can detect a response based on the signal from a single transmitter. The signal received by two spaced-apart receivers 104 can have a phase and amplitude difference. In different embodiments, the transmitter module 103 and the receiver modules 104-1 . . . 104-N of the modular logging tool 105 are within a single tool body corresponding to one or more logging tools. Alternatively, the transmitter module 103 and the receiver modules 104-1 . . . 104-N of the logging tool 105 are distributed across a plurality of tool bodies. The plurality of tool bodies may correspond to a single logging tool or multiple logging tools that share some components. In different embodiments, the plurality of tool bodies with distributed transmitter modules and/or receiver modules can be coupled to each other directly or indirectly. Also, the coupling of tool bodies can be rigid or flexible. For example, in a logging-while-drilling scenario, a rigid coupling between tool bodies is needed. Meanwhile, in a wireline logging scenario, a rigid or flexible coupling between tool bodies may be used. The coupling components between tool bodies with transmitter and/or receiver modules may be, for example, a wireline, an umbilical, a slickline, coiled tubing, metallic tubulars (drill string or casing segments), wired tubulars, or other couplers.

In an embodiment, an arrangement of transmitter 103 and receivers 104 can operate in conjunction with a processing unit 108 to adjust (e.g., correct) real-time formation property measurements between two or more BHA positions so as to deal with synchronization issues among antenna subs having different clock systems. In such an embodiment, the apparatus can resolve the synchronization issues, as described in greater detail below, to provide a more accurate formation property measurement for field operators, such as in real-time.

Processing unit 108 provides signals to selectively or continually activate transmitter 103 and acquire measurement signals at the arrangement of receivers 104 in real-time. In such examples, "real-time" includes common delays associated with transmitting signals from the well 102 to the processing unit 108, such as material or physical property delay attributes. As discussed herein, signals or measurements include electromagnetic measurements.

It is to be clearly understood, processing unit 108 can be located at the surface of well 102 operably in communication with tool 105 via a communication mechanism. Such a communication mechanism can be realized as a communication vehicle that is standard for well operations. Processing unit 108 can be distributed along the mechanism by which tool 105 is placed downhole in well 102. Processing unit 108 can be integrated with tool 105 such that processing unit 108 is operable downhole in well 102. In alternative embodiments, the processing unit 108 can be distributed along tool 105 or along a structure that delivers tool 105 downhole.

In various embodiments, a processing methodology operatively synchronizes real-time signals without a dedicated synchronization bus. The tool 105 can be used as a MWD tool such as a LWD tool. In addition, the tool 105 can be adapted as a wireline tool.

Generally, complex voltage measurements of a receiver antenna (i.e., antenna of the first receiver 104-1) that are processed by processing unit 108 in response to a firing (i.e., transmission) of transmitter antenna 103 can be given by Equation (1), expressed as:

$$V_{Rx} = \text{Amp}_{Target} \times e^{j(pha_{Tx} + pha_{Rx} + pha_{Target})}, \quad (1)$$

where $\text{Amp}_{Target}$ is the magnitude of the complex measurement, $pha_{Tx}$ is the phase delay in the electronics of the transmitter antenna, $pha_{Rx}$ is the phase delay in the electronics of the receiver antenna and $pha_{Target}$ is the phase delay of the target signal. It should be noted that $\text{Amp}_{Target}$ of the complex measurement is typically affected by any media in between the transmitter antenna and the receiver antenna, but not affected by any electronics at the transmitter and/or receiver antennas. This is due to the Fourier Transform scheme applied to the measurement to determine the magnitude of a detected target signal (typically as formation signal) only. The phase part of the measured complex voltage signal comprises three parts: $pha_{Tx}$, $pha_{Rx}$ and $pha_{Target}$ described above. In order to acquire accurate complex voltage signal only from the target, the phase delay in both the transmitter antenna and receiver antenna should be captured and/or synchronized.

On the other hand, LWD conventional electromagnetic (EM) resistivity tools acquiring measurement values typically utilize ratio signals of the complex measurements (i.e., resistivity measurements) to characterize formation properties surrounding the tools. True formation resistivity is a key petrophysical parameter that helps petrophysicists to characterize and develop a reservoir. A resistivity measurement presents an EM property of formations surrounding the logging tools, where different formations have distinct and unique resistivity readings. A continuous resistivity log allows petrophysicists to recognize formation geology and to develop a good wellbore placement program for maximum oil production in the reservoir. Such ratio signals are typically obtained by collecting signal measurements of two receivers (i.e., receivers 104-2 and 104-N) in response to firing transmitter antenna (i.e., transmitter 103). Equation (2a) and Equation (2b) below describe the two electromagnetic receiver measurements:

$$V_{Rx1} = \text{Amp}_1 \times e^{j(pha_{Tx} + pha_{Rx1} + pha_1)} \quad (2a)$$

$$V_{Rx2} \times \text{Amp}_2 \times e^{j(pha_{Tx} + pha_{Rx2} + pha_2)} \quad (2b)$$

where $\text{Amp}_1$ and $\text{Amp}_2$ are the magnitudes of the complex measurements, $pha_{Rx1}$ and $pha_{Rx2}$ are the phase delay in the electronics of the first and second receiver antennas, respectively, and $pha_1$ and $pha_2$ are the phase delays of the target signals. Since the two receiver measurements are made based on the transmission from the same transmitter antenna, phase delay of the transmitter antenna should be the same for both measurements. In addition, the two receiver antennas are normally part of the same electronic device and receive the signals simultaneously. Therefore, the phase delay ($pha_{Rx1}$ and $pha_{Rx2}$) of the signals received by the substantially identical electronic devices is also expected to be about the same. In general, the phase delay (or phase offset) of the two corresponding receiver antennas is calibrated out such that there is no receiver phase delay difference between the two signals (either $pha_{Rx1} - pha_{Rx2} = 0$ or $pha_{Rx1} = pha_{Rx2} = 0$). Equation (3) describes how conventional induction-type LWD resistivity measurement tools eliminate the phase delay difference by taking the ratio between the two receiver measurements and determining the signals only from the surrounding target signal:

$$\frac{V_{Rx1}}{V_{Rx2}} = \quad (3)$$

$$\frac{\text{Amp}_1}{\text{Amp}_2} \times e^{j(pha_{Rx1} - pha_{Rx2})} \times e^{j(pha_1 - pha_2)} = \frac{\text{Amp}_1}{\text{Amp}_2} \times e^{j(pha_1 - pha_2)}$$

Because there is no synchronization among antennas, the first issue is the mismatch between the true operating frequencies of the reflected transmit signals measured at the receiver circuit (i.e., antenna of the first receiver 104-1) and the defined transmitter operating frequency, causing inaccurate amplitude determination by the Fourier Transform process. Particularly, a fixed transmitter operating frequency is transmitted from transmitter antenna 103, and same operating frequency value is used in receiver antennas (e.g., first receiver's antenna 104-1) to perform Fourier Transform and acquire the corresponding complex amplitude characteristics (or phase and magnitude). However, if the transmitter clock signal and receiver clock signal are not properly calibrated and/or synchronized downhole in the well 102, the actual operating frequency will be drifted when the amplitude of the received signal is measured and Fourier Transform is performed based on the acquired receiver measurements. Especially, the clock of individual subs may randomly drift in response to changing operating parameters (such as temperature, for example).

If one sub's clock is faster than the other's and there is no dedicated bus to synchronize the clocks among different subs, the operating frequency is drifted and then any resistivity tool that measures the amplitude of the received signal and uses the measured amplitude to perform Fourier Transform would get inaccurate results without knowing the true operating frequency of the transmitter. It should be noted that clock synchronization process is somewhat complex and time consuming. For example, two clocks can be synchronized in a multi-antenna resistivity tool by performing the following steps: generating a signal associated with a first clock; modulating the signal; transmitting the modulated signal; receiving the modulated signal by a receiver associated with a second clock; correlating the received signal; determining the time of arrival of the received signal; determining the time difference between the two clocks; and synchronizing the two clocks. Therefore, various embodiments of the present invention disclose novel methods of resolving clock synchronization issues without performing actual clock signal synchronization between the arrangement of transmitter sub 103 and receiver subs 104-1, 104-2 . . . 104-(N−1), 104-N.

Figure 11:
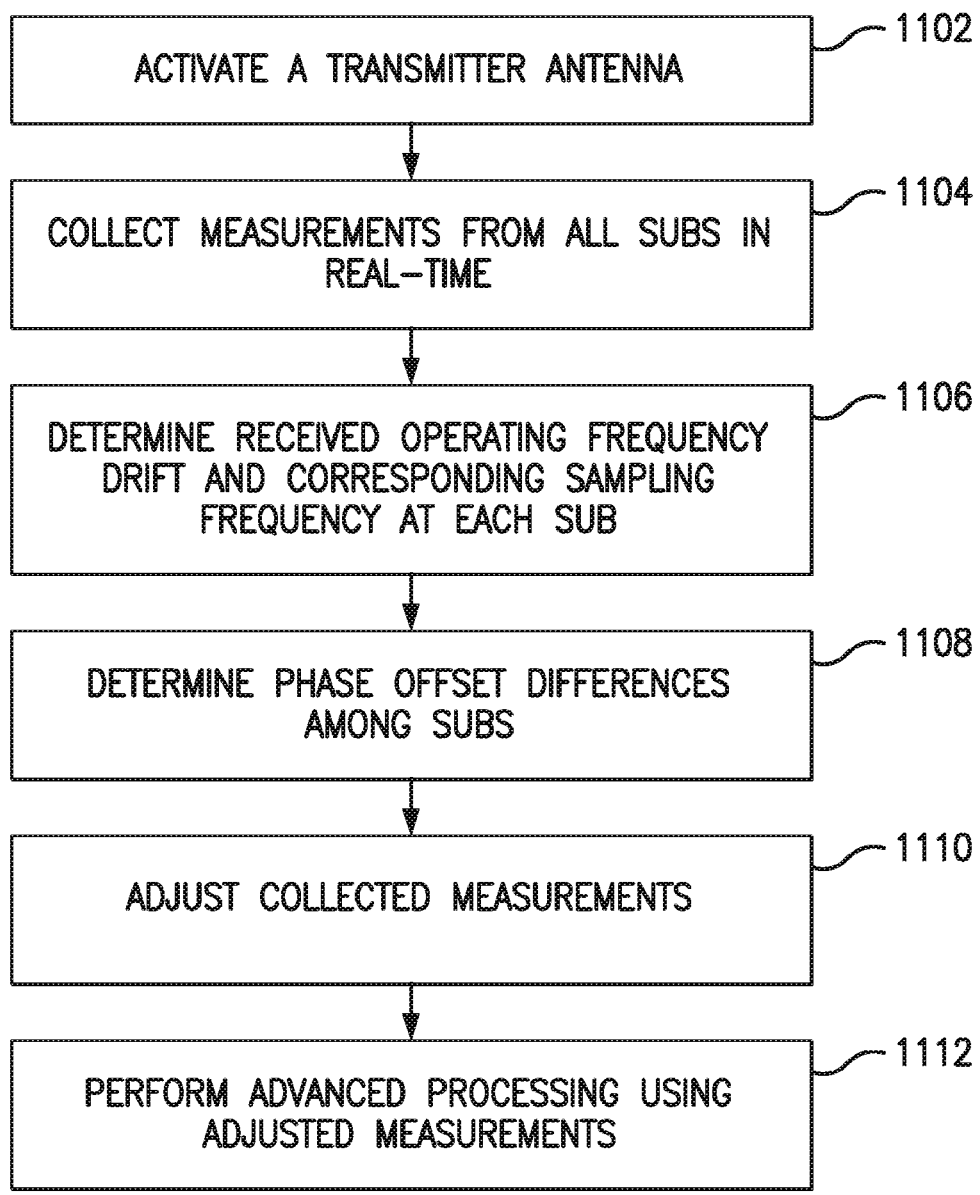
FIG. 11 illustrates a method of synchronizing signals among antennas with different clock system, in accordance with an embodiment of the present invention.

Turning now to FIG. 11, a flow diagram is shown depicting a process of synchronizing signals among antennas with different clock system, in accordance with an embodiment of the present invention. Before turning to description of FIG. 11, it is noted that the flow diagram in FIG. 11 shows an example in which operational steps are carried out in a particular order, as indicated by the lines connecting the blocks, but the various steps shown in this diagram can be performed in any order, or in any combination or sub-combination. It should be appreciated that in some embodiments, some of the steps described below may be combined into a single step. In some embodiments, one or more steps may be omitted. In some embodiments, one or more additional steps may be performed. As will be appreciated by one skilled in the art, aspects of the present disclosure may be embodied as a method or computer program product. In some embodiments, the method described below may be performed, at least in part, by the processing unit 108 (depicted in FIG. 1).

At 1102, a transmitter antenna 103 along a longitudinal axis of an arrangement can be activated at an initial time. The first transmitter antenna can be configured to operate at a fixed operating frequency, as described below. At 1104, antennas at one or more receiver subs 104-1, 104-2 . . . 104-(N−1), 104-N can be activated at the initial time and a first plurality of measurements can be collected in real-time, such as at the receiver 104-1. The first receiver sub 104-1 and the transmitter sub antenna 103 can be a known distance apart. The first plurality of measurements can be associated with the first receiver antenna 104-1. Similarly, at 1104, a second plurality of measurements can be collected in real-time, such as at a second receiver sub 104-2 and so on.

Further, once the transmitter 103 and one or more receiver antennas 104 are activated they can run continuously or discreetly, such as at a given interval. The arrangement of transmitters and receivers can be included on a tool structure, such as tool 105 of FIG. 1 and described herein.

The first, second, third, etc. plurality of measurements can be collected over a predetermined time interval beginning from the initial recording time. For example, from the beginning of a drilling operation to the end of a drilling operation or any time interval therein. In an example, collecting the plurality of measurements can include collecting within time-domain, such that each measurement of the plurality of measurements is associated with a time, the first receiver antennas, the second receiver antenna, etc. and amplitude. That is, the each collected measurement can be associated with the respective transmitter antenna and the respective receiver antenna.

At 1106, received operating frequency drift and corresponding DFT amplitudes corresponding to each sub are determined.

The following table (Table 1) illustrates one case of operating frequency drift as non-limiting example:

TABLE 1

| Antenna | Oscillator Frequency | Sampling Frequency (fs) | Operating Frequency | Operating Frequency Variation |
|---|---|---|---|---|
| Transmitter | 16.384 MHz − 250 ppm = 16.379904 MHz | $\frac{16.379904 \text{ MHz}}{2^{10}} =$ 15.996 kHz | 15.996 kHz / 8 = 1.9995 kHz | 0.5 Hz |
| Receiver | 16.384 MHz + 250 ppm = 16.388096 MHz | $\frac{16.388096 \text{ MHz}}{2^{10}} =$ 16.004 kHz | $1.9995 \times \frac{16}{16.004} =$ 1.9990 kHz | 1 Hz |

In the illustrated example, the designed operating frequency is 2 kHz and the oscillator clock frequency is 16.384 MHz. An oscillator is often used as a reference clock for system integration in various electronic devices. Assuming there is ±250 ppm drift in time in the same operational temperature range and assuming worst-case drift rates for corresponding clocks (i.e., −250 ppm drift at the transmitter and +250 ppm drift at the receiver), as indicated in Table 1, the true operating frequency ($f_{0_{T_x}}$) of a transmit signal drifts to 1.9995 kHz. Also, like with the transmitter, the sampling frequency ($f_{s_{R_x}}$) of the receiver also drifts due to the receiver clock drift. Accordingly, the discrete data acquired by an electromagnetic measurement tool at the receiver will have operating frequency value different from the transmitter's true operating frequency value. Novel measurement processing methods provided by various embodiments of the present invention do not use any clock information, but rather they use the original receiver sampling frequency ($f_s$) of 16.004 kHz to process measurements acquired by the receiver. According to an embodiment of the present invention, the final operating frequency ($f_{0_{Rx}}$) measured by the receiver sub can be given by Equation (4):

$$f_{0_{Rx}} = f_{0_{Tx}} \times \frac{f_s}{f_{s_{Rx}}} \qquad (4)$$

As shown in Table 1 above, the illustrated worst-case drift scenario will produce the frequency variation of 1 Hz at the receiver measurement. Thus, one or more embodiments provide novel methods of determining the operating frequency drift. In a worst case situation (e.g., −250 ppm at the transmitter clock and +250 ppm at receiver clock), the tool 105 with non-synchronized clocks will produce different sampling frequencies at the transmitter 103 ($fs_{Tx}$) and at the receiver ($fs_{Rx}$), whereas the $fs_{Tx}$ is used typically to produce and/or sample a signal with operating frequency ($f_{0_{Tx}}$). According to an embodiment of the present invention, the transmitter 103 generates two input signals described by Equations (5a) and (5b) using the transmitter sampling frequency—a first input signal (Signal 1) having an amplitude of 1.0 and a second input signal (Signal 2) having amplitude of 0.5:

$$\text{Signal } 1(n) = 1.0 \times \cos\left(2\pi f_{0_{Tx}} \times \frac{1}{fs_{Rx}} \times (n)\right) \qquad (5a)$$

$$\text{Signal } 2(n) = 0.5 \times \cos\left(2\pi f_{0_{Tx}} \times \frac{1}{fs_{Rx}} \times (n)\right) \qquad (5b)$$

Figure 2:
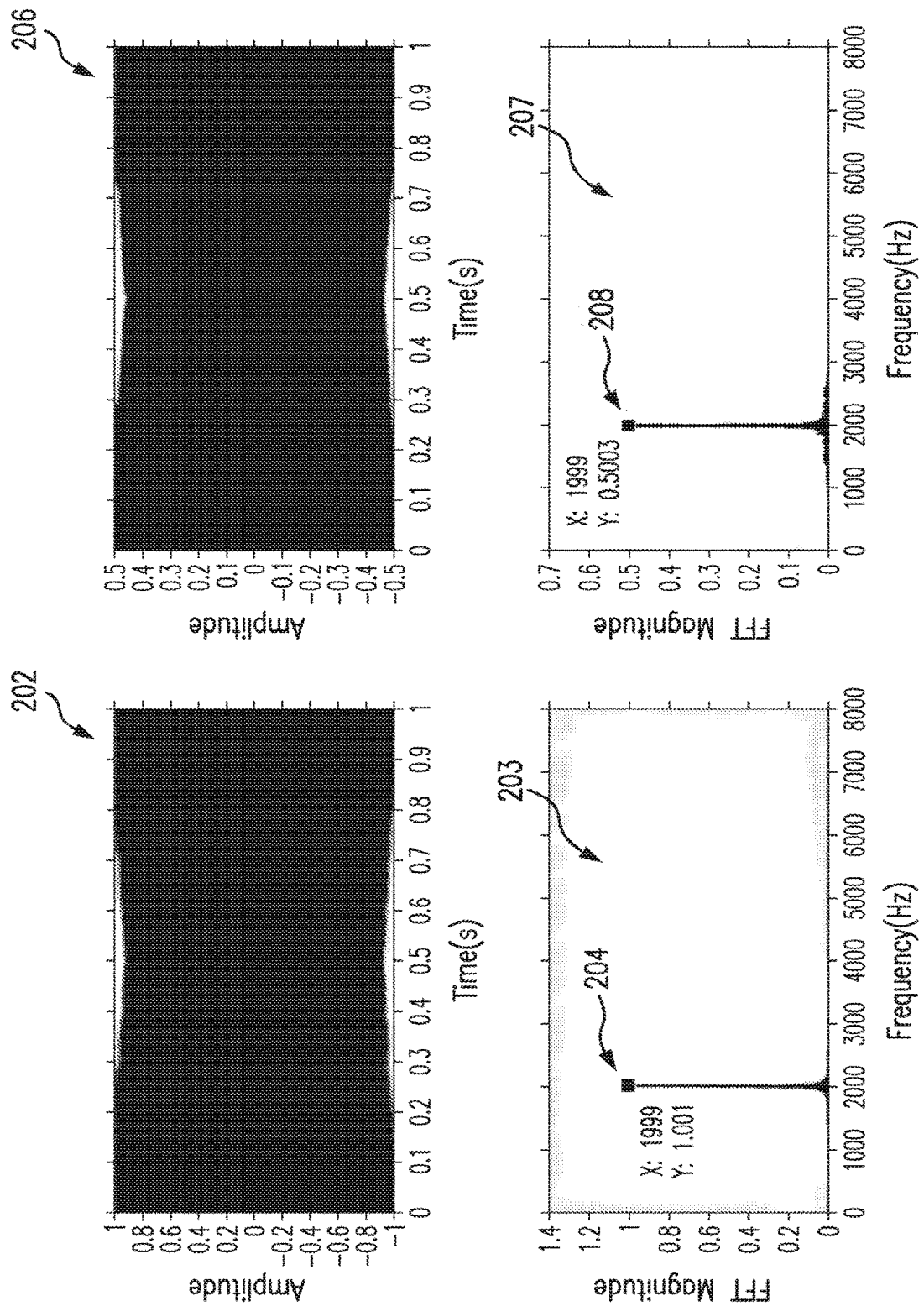
FIG. 2 shows plots of the amplitude of exemplary signals in the time domain and corresponding frequency spectrums after Fourier Transform.

Since the system and methods described herein do not utilize any clock information, the Fourier Transform is achieved using the designed sampling frequency ($f_s$). FIG. 2 shows plots of the amplitude of exemplary signals in the time domain and corresponding frequency spectrums after Fast Fourier Transform (FFT). A first plot 202 illustrates amplitude changes of a first signal having amplitude of 1 and having an operating frequency of 1.9995 kHz (transmitter operating frequency in Table 1). A second plot 206 illustrates amplitude changes of a second signal having amplitude of 0.5 and also having an operating frequency of 1.9995 kHz. A third plot 203 and a fourth plot 207 are plots of FFT magnitude versus frequency for the first and second signals, respectively. As shown in FIG. 2, by taking one-second measurements at the receiver (e.g., first receiver sub 104-1) using the operating frequency of 2 kHz as well as the parameters in Table 1 above, both the first signal and the second signal have the peak amplitude at 1999 Hz, as obtained via FFT, which are denoted by reference numerals 204 and 208, respectively.

Figure 3:
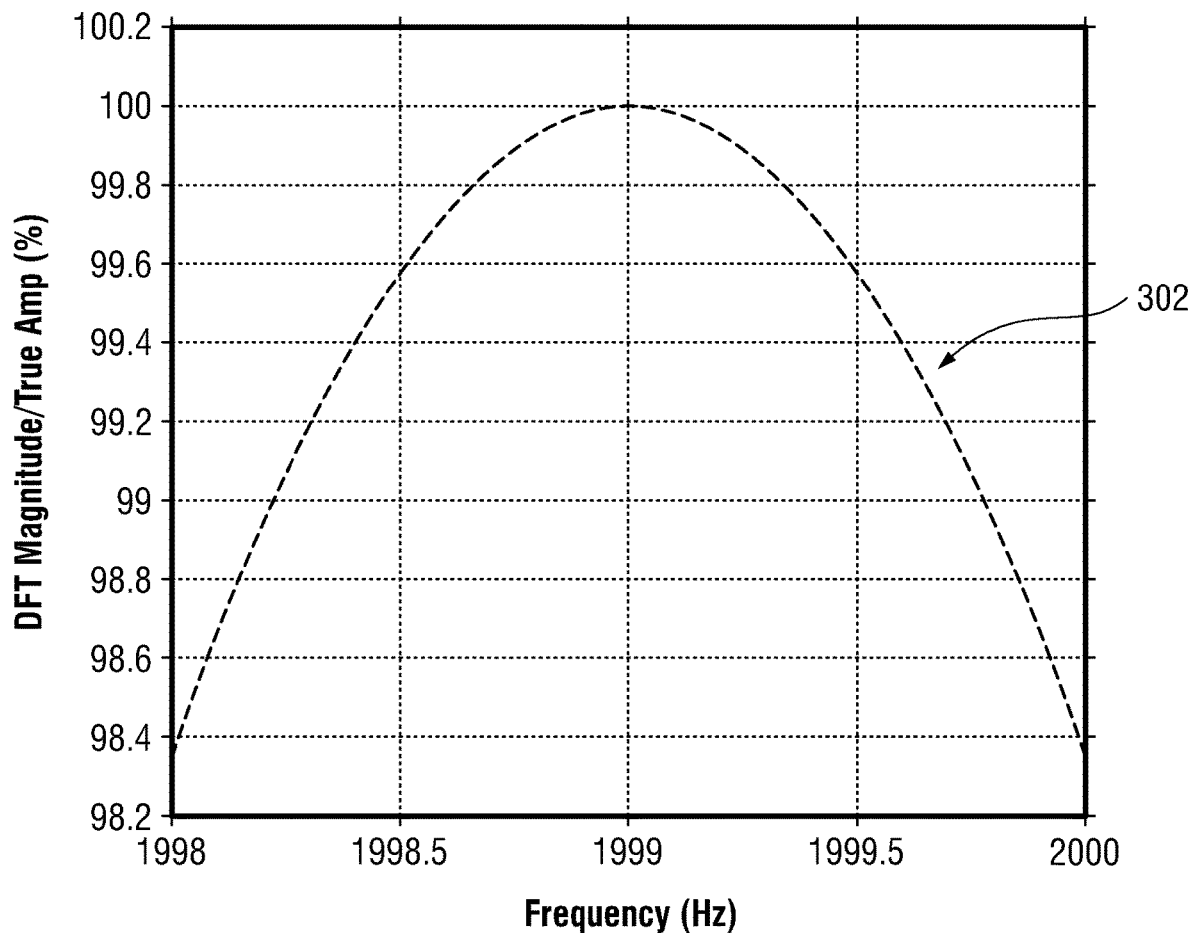
FIG. 3 is a plot of the normalized amplitude of a discrete Fourier transform (DFT) process of one of the signals of FIG. 2 in accordance with an embodiment of the present invention.

Next, according to an embodiment of the present invention, the processing unit 108 performs individual discrete Fourier transform (DFT) processing operations associated with an operating frequency. An individual processing operation should be understood to mean a processing operation associated with a single operating frequency of 2 kHz (e.g., DFT frequency range from 1.998 kHz to 2.002 kHz). FIG. 3 is a plot of the normalized amplitude of a DFT processing operation of the illustrative second signal of FIG. 2, in accordance with an embodiment of the present invention. The processing unit 108 can use the plot 302 shown in FIG. 3 to capture the incidental operating frequency drift at the receiving antenna by evaluating the peak values of DFT amplitudes near the operating frequency of 2 kHz.

Figure 4:
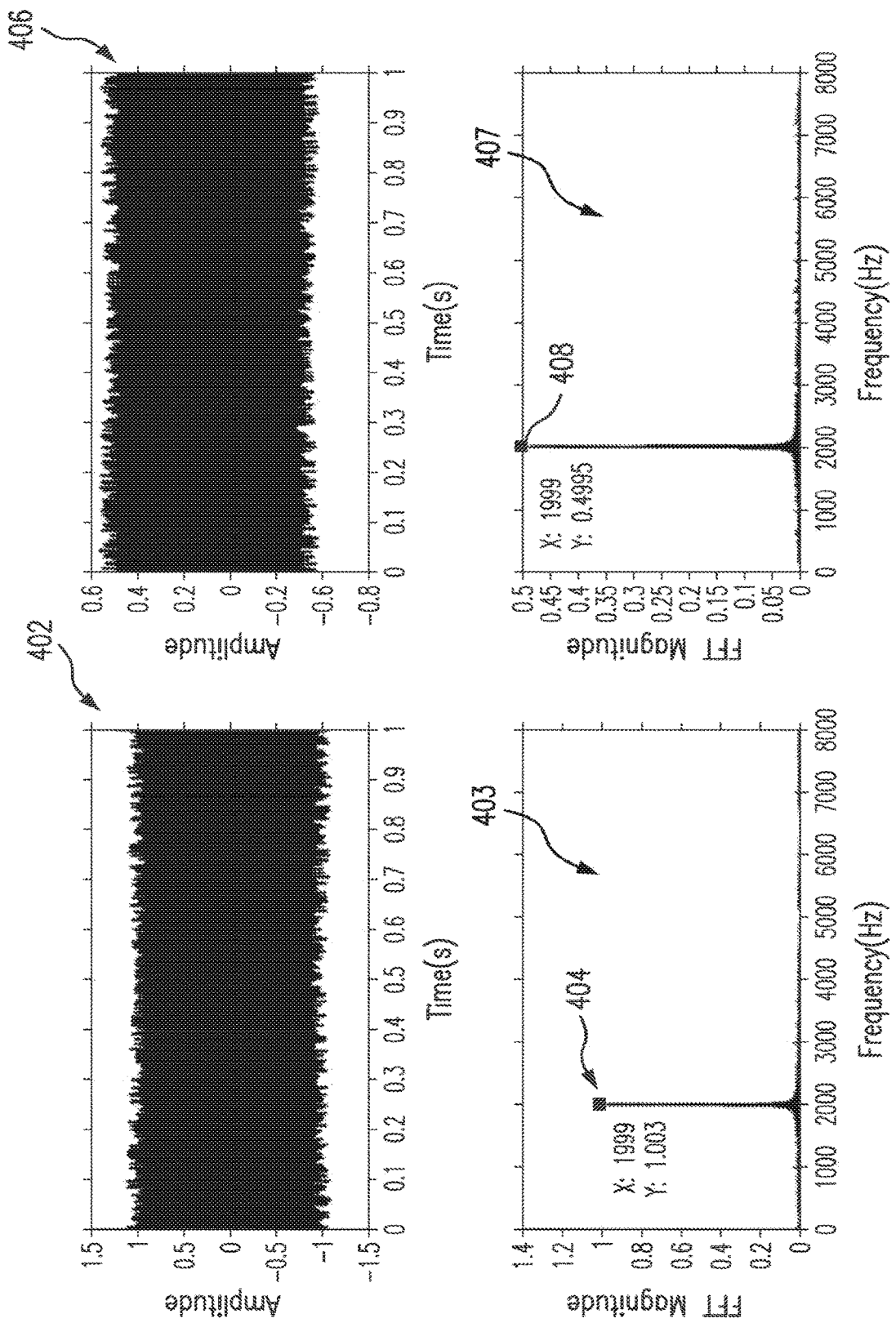
FIG. 4 shows plots of the amplitude of exemplary signals of FIG. 2 in the time domain with introduced random noise having Signal to Noise Ratio (SNR) equal to 10 and corresponding frequency spectrums after Fourier Transform.

The proposed methods were evaluated by injecting purely random noise to the signals described by the Equation (5a) and Equation (5b) above, so that signal to noise ratio (SNR) of 10 is achieved. FIG. 4 shows plots of the amplitude changes 402 and 406 of the first and second signals of FIG. 2, respectively, in the time domain with injected purely random noise having SNR equal to 10. Just like in FIG. 2, both signals have an operating frequency of 1.9995 kHz. In addition, FIG. 4 includes plots 403 and 407 which are plots of FFT magnitude versus frequency for the first and second signals, respectively. Similarly to FIG. 2, both the first signal and the second signal have the peak amplitude at 1999 Hz, as obtained via FFT, which are denoted in this case by reference numerals 404 and 408, respectively.

Figure 5:
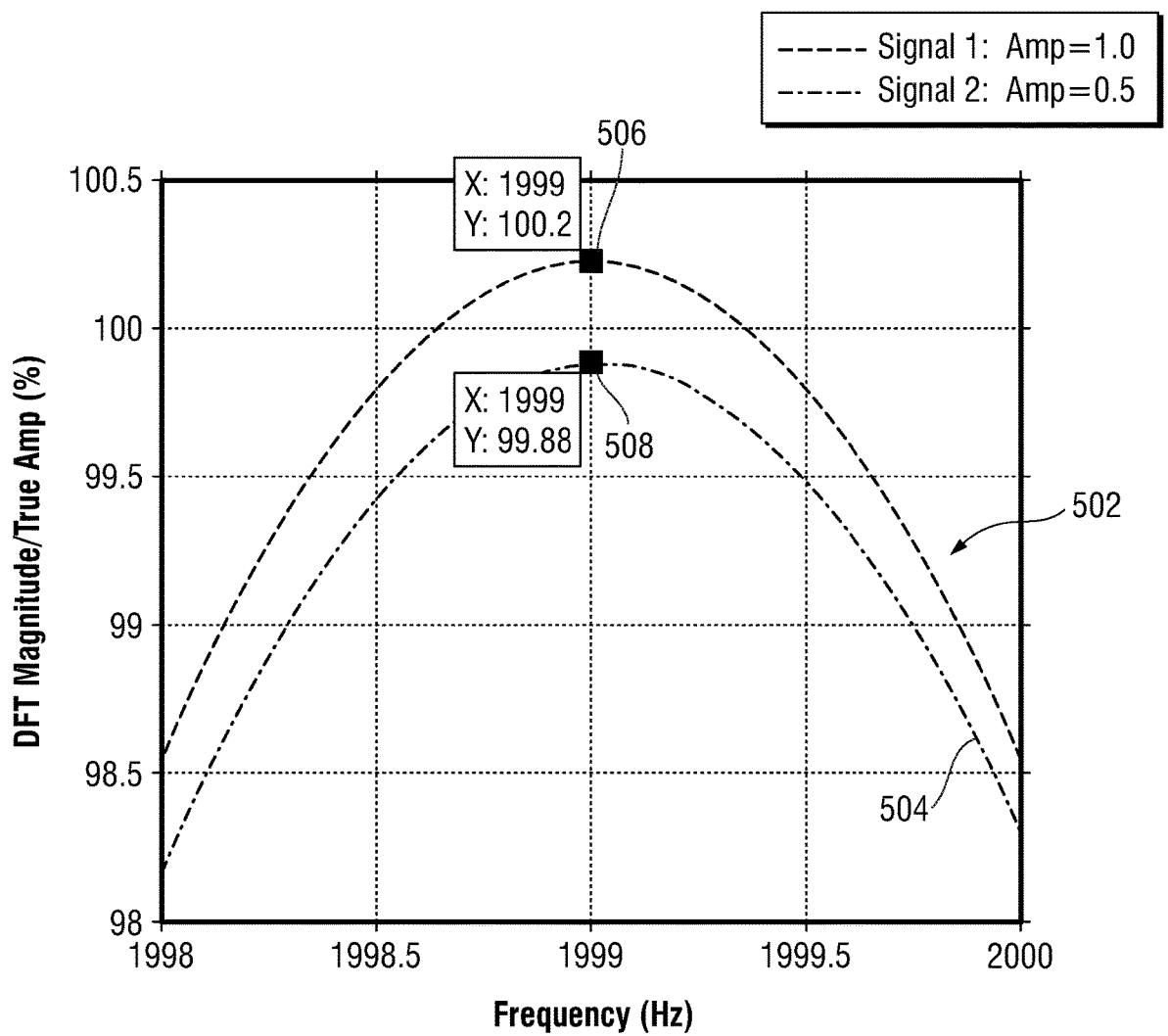
FIG. 5 shows plots of the normalized amplitude of a DFT process of the signals with introduced random noise of FIG. 4 in accordance with an embodiment of the present invention.

FIG. 5 shows plots 502 and 504 of the normalized amplitude of a DFT processing operation of the signals with introduced random noise of FIG. 4, in accordance with an embodiment of the present invention. The processing unit 108 can use the plots 502 and 504 shown in FIG. 5 to capture the peak values of DFT amplitudes 506 and 508 near the operating frequency of 2 kHz. FIG. 5 illustrates that when purely random noise is injected into the input signals, substantially similar results are achieved by the proposed methods.

Figure 6:
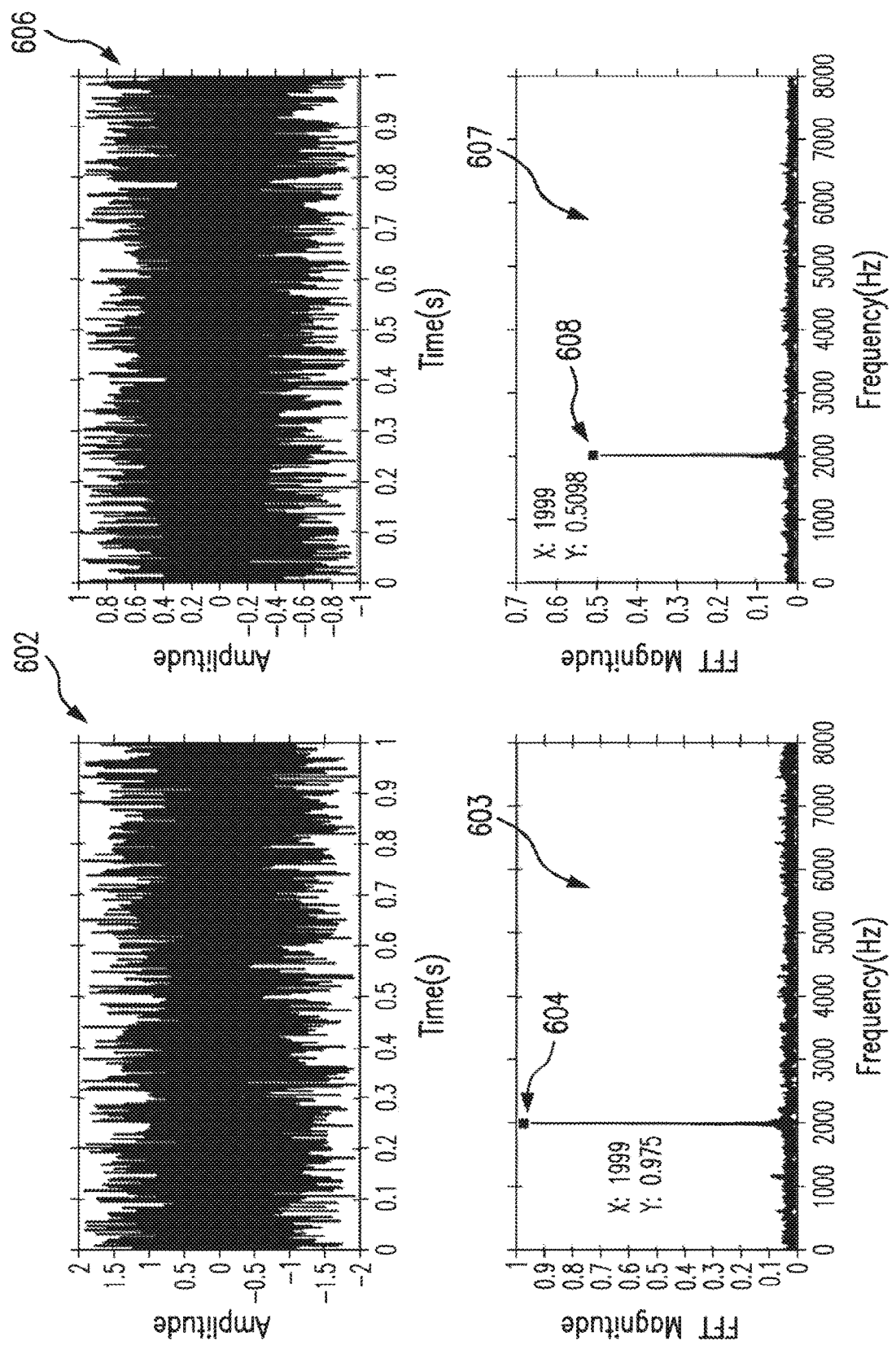
FIG. 6 shows plots of the amplitude of exemplary signals of FIG. 2 in the time domain with introduced random noise having SNR=1 and corresponding frequency spectrums after Fourier Transform.

The proposed methods were further evaluated by injecting purely random noise having SNR of 1 to the signals described by the Equation (5a) and Equation (5b) above. FIG. 6 shows plots of the amplitude changes 602 and 606 of the first and second signals of FIG. 2, respectively, in the time domain with injected purely random noise having SNR equal to 1. In addition, FIG. 6 includes plots 603 and 607 which are plots of FFT magnitude versus frequency for the first and second signals, respectively. Even in this scenario, both the first signal and the second signal have the peak amplitude at 1999 Hz, as obtained via FFT, which are denoted in this case by reference numerals 604 and 608, respectively.

Figure 7:
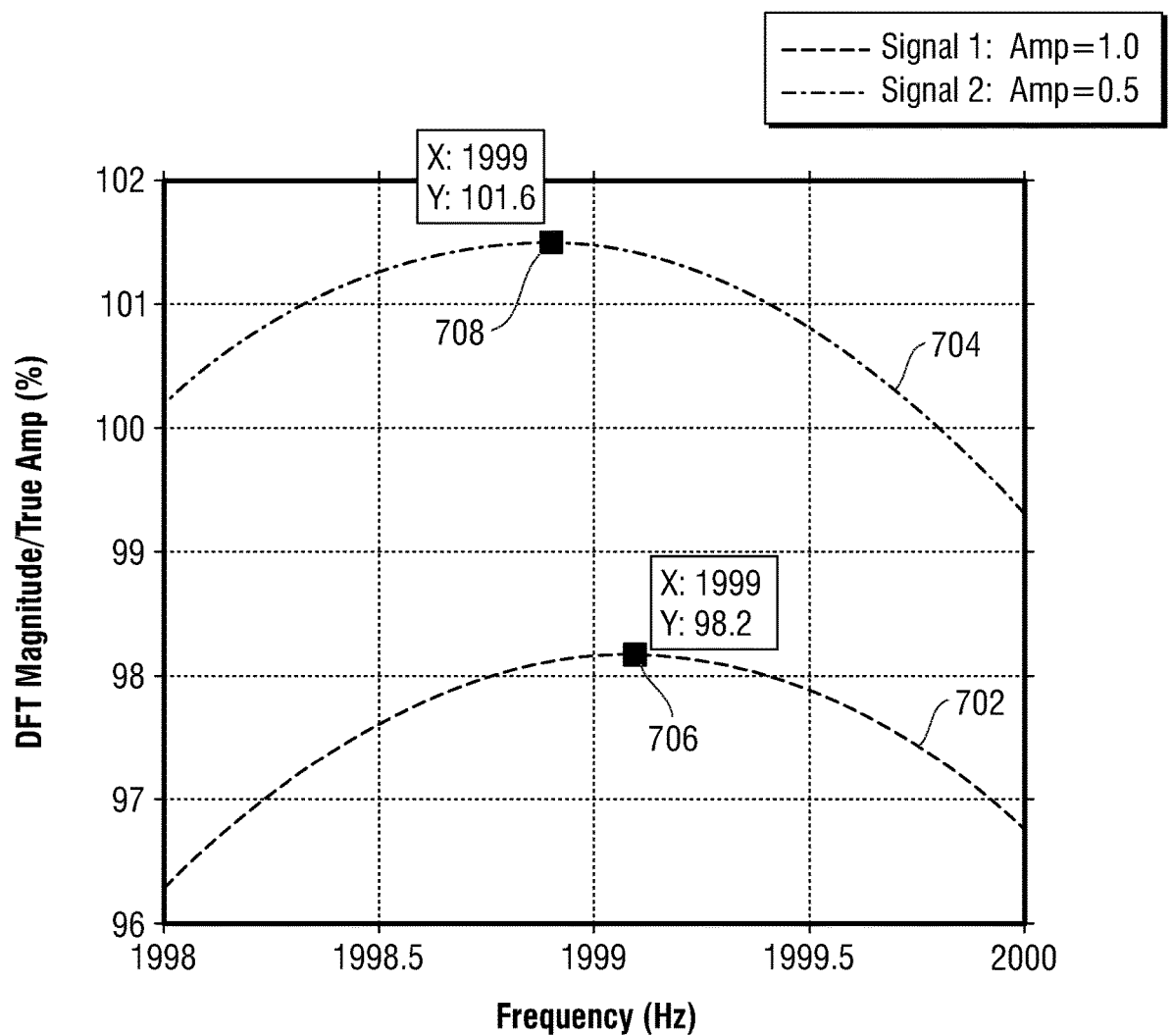
FIG. 7 shows plots of the normalized amplitude of a DFT process of the signals with introduced random noise of FIG. 6 in accordance with an embodiment of the present invention.

FIG. 7 shows plots 702 and 704 of the normalized amplitude of a DFT processing operation of the signals with introduced random noise having SNR of 1 of FIG. 4, in accordance with an embodiment of the present invention. The processing unit 108 can use the plots 702 and 704 shown in FIG. 7 to capture the peak values of DFT amplitudes 706 and 708 near the operating frequency of 2 kHz. FIG. 7 illustrates that even if purely random noise having unlikely SNR of 1 is injected into the input signals, substantially similar results still can be obtained by the proposed methods.

Once the received operating frequency is determined, the processing unit 108 can use this information to align the sampling frequency of the receiver. In Equation (6) below, the ideal signals (signals having no uncertainties arising from the clock drift) are represented by the left hand size of the equation. It will be apparent to one having had the benefit of the present disclosure that the right hand size of Equation (6) can be used for processing the received measurements based on the receiver's operating frequency $f_{0_{Rx}}$:

$$\text{Sin}[n] = \qquad (6)$$
$$Amp \times \cos\left(2\pi f_0 \times \frac{1}{f_s} \times n\right) \equiv Amp \times \cos\left(2\pi f_{0_{Rx}} \times \frac{1}{f_{s_{RxNew}}} \times n\right),$$

where Amp is the magnitude of the measurements, $f_o$ is the designed operating frequency, $f_s$ is the designed sampling frequency, $f_{o_{Rx}}$ is the determined operating frequency of the receiver device and $f_{s_{RxNew}}$ is the adjusted sampling frequency at the receiver.

Consequently, Equation (6) can be rewritten as Equation (7):

$$f_{s_{RxNew}} = f_{o_{Rx}} \times \frac{f_s}{f_o} \qquad (7)$$

According to an embodiment of the present invention, at step 1106, the processing unit 108 utilizes Equation (7) to determine an adjusted sampling frequency at the receiver.

Continuing with the example above, the designed operating frequency is 2 kHz but the determined operating frequency of the receiver is 1.999 kHz. Also, the designed sampling frequency is 16 kHz. Putting these numbers into Equation (7) yields receiver's sampling frequency for the provided example: 1.999 kHz×16 kHz/2 kHz=15.992 kHz. Consequently, the processing unit 108 should adjust the receiver's sampling frequency value to 15.992 kHz to process signals acquired by the corresponding receiver in the example illustrated above.

Figure 8:
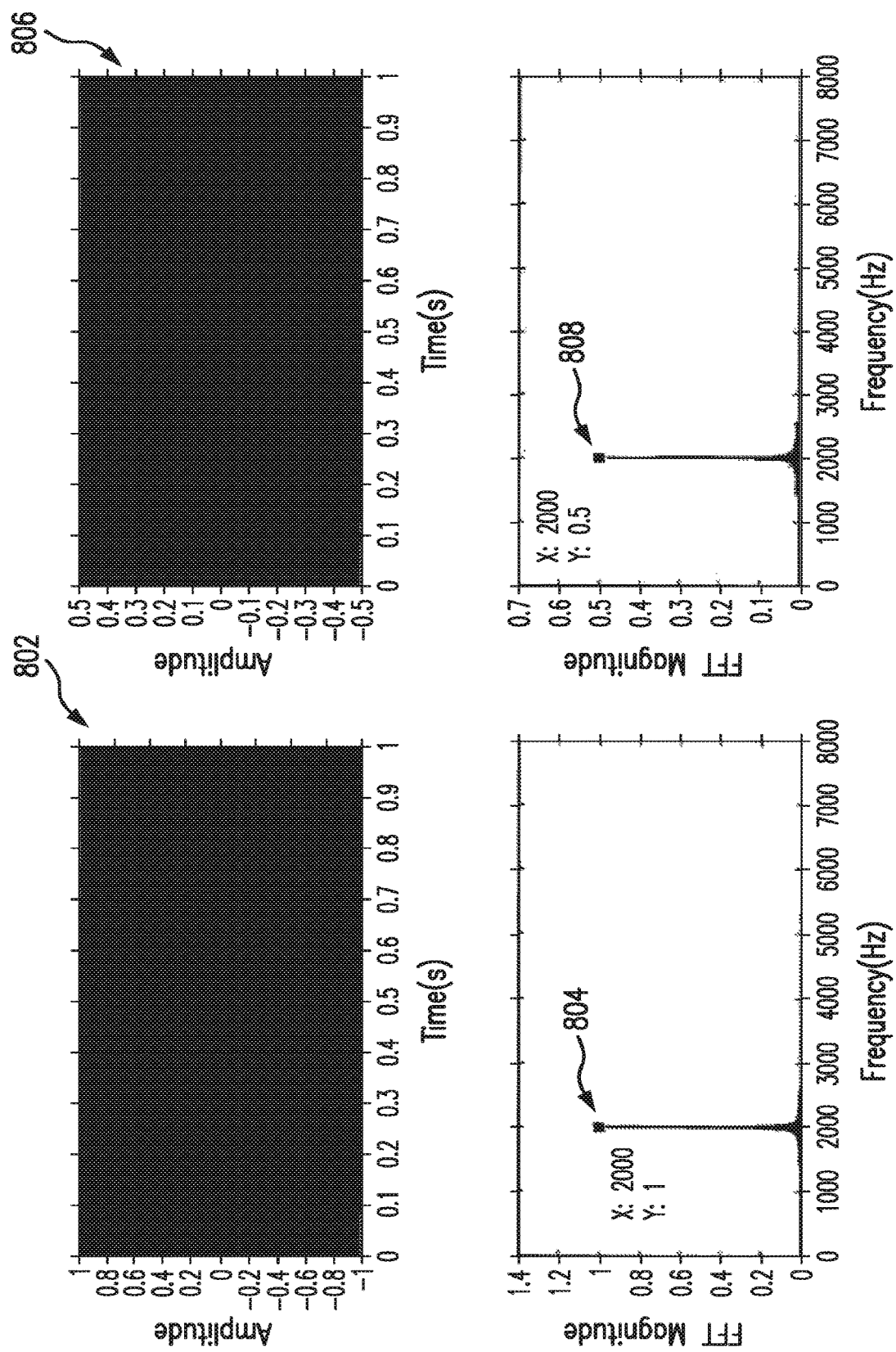
FIG. 8 shows plots of the amplitude of exemplary signals in the time domain and corresponding frequency spectrums after Fourier Transform using adjusted sampling frequency of the receiver, according to an embodiment of the present invention.
Figure 9:
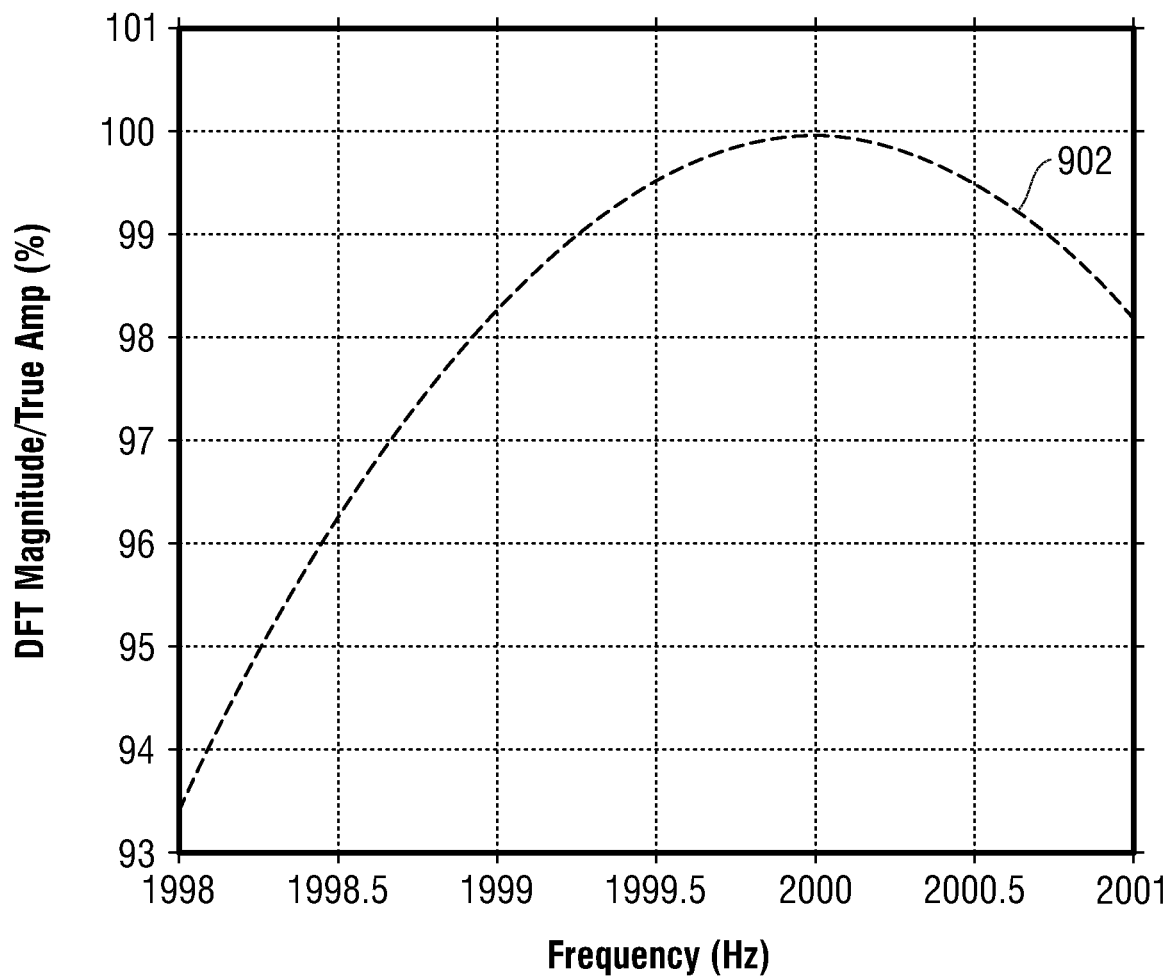
FIG. 9 is a plot of the normalized amplitude of a DFT process of one of the signals of FIG. 8 based on adjusted sampling frequency, in accordance with an embodiment of the present invention.

Still referring to step 1106 in FIG. 11, once the sampling frequency of the receiver is adjusted by the processing unit 108, the DFT processing operation (using $f_s$ and $f_o$) can accurately process the received measurement by using 2 kHz as peak amplitude, as shown in FIGS. 8 and 9. FIG. 8 shows plots 802 and 806 of the amplitude of exemplary signals in the time domain and corresponding frequency spectrums after Fourier Transform using adjusted sampling frequency of the receiver, according to an embodiment of the present invention. As shown in FIG. 8, the discrete time-domain signals in the plots 802 and 806 do not have any amplitude modulation when the adjusted receiver sampling frequency is used. In contrast, the discrete time-domain signals in FIG. 2 have such amplitude modulation based on the original sampling frequency. Evidently, if receiver's sampling frequency is properly adjusted, both the first signal and the second signal have the peak amplitude at 2 kHz, as obtained via FFT. The peak amplitudes for the first and second signals are denoted by reference numerals 804 and 808, respectively. FIG. 9 is a plot 902 of the normalized amplitude of the DFT processing of the signals of FIG. 8 based on adjusted sampling frequency, in accordance with an embodiment of the present invention. FIG. 9 illustrates that when the adjusted sampling frequency is used the real peak amplitude is at 2 kHz.

Even though the received operating frequency as well as the sampling frequency of the receiver can be determined by the processing unit 108 using methods described above, the computational adjustment scheme described herein should also resolve phase delay issues between the transmitter and receiver subs at step 1108. In one embodiment, in order to determine the phase delay of the signal measured by a receiver 104 in response to the firing of the transmitter 103, the tool 105 may include a device (not shown in FIG. 1) installed at the transmitter 103 and configured to measure the current signal during the transmitter antenna 103 firing. Such current signal carries phase delay identical to the phase delay of the transmission signal. Therefore, in this embodiment, the processing unit 108 can normalize individual receiver measurements with respect to transmitter 103 firing by utilizing corresponding current measurements of that transmitter 103, as described by Equation (8):

$$V_{Rx} = \frac{Amp_{Target}}{I_{Tx} e^{j(pha_{Tx})}} \times e^{j(pha_{Tx}+pha_{Rx}+pha_{Target})} = \qquad (8)$$
$$\frac{Amp_{Target}}{I_{Tx}} \times e^{j(pha_{Rx}+pha_{Target})}$$

where $V_{Rx}$ represents the electromagnetic receiver measurement, $Amp_{Target}$ is the amplitude of the target signal, $I_{Tx}$ represents the measured current signal of the transmitter, j is the unit imaginary number (also denoted as i), which is used to express complex numbers, $pha_{Tx}$ represents phase delay of the transmitter 103, $pha_{Rx}$ represents phase delay of the receiver 104, $pha_{Target}$ represents phase delay of the target signal.

Another method for synchronizing phase delay differences involves determining the relative phase delay among antennas before taking measurements as a self-calibration scheme described below. According to this alternative embodiment, to achieve this self-calibration the transmitter sub 103 and receiver subs 104 can communicate with each other via the interconnecting bus 106 or via wireless communication using a very low frequency signal, such as signal ranging from about 1 Hz to about 100 kHz. This processing method involves identifying the relative synchronization among clock systems located at different subs and will be described below with reference to FIG. 10.

Figure 10:
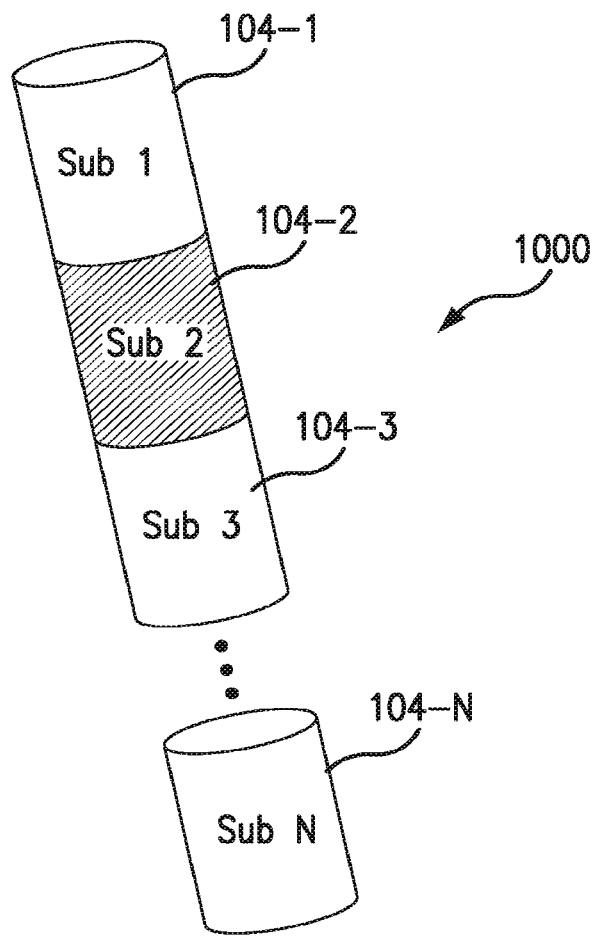
FIG. 10 is a schematic block diagram of a multi-sub configuration, each sub having different clock system, in accordance with an embodiment of the present invention.

FIG. 10 is a schematic block diagram of a multi-sub receiver configuration, in accordance with an embodiment of the present invention. In the arrangement 1000 shown in FIG. 10 there are N receiver subs 104-1, 104-2, . . . , 104-N, and each sub having a different clock system. According to this embodiment, the second receiver 104-2 is configured to determine the phase delay relative to first receiver's 104-1 phase delay provided by either a dedicated signal transmitted over the bus 106 or a corresponding low-frequency wireless signal communication between the first 104-1 and second 104-2 receiver subs. Similarly, the third receiver 104-3 is configured to determine its phase delay relative to the second receiver sub 104-2. According to this embodiment, each of the receiver subs 104-1, . . . , 104-N can send the determined relative phase delay values to the processing unit 108. The processing unit 108 is further configured to use received relative phase delays among subs 104 to adjust measurements acquired at each receiver sub 104. For example, assuming phase delay of the first sub 104-1 is $e^{j pha_1}$, then phase delay of the sub N can be expressed as $e^{j(pha_1 + pha_n)}$, where $pha_n$ is the relative phase delay between the first receiver sub 104-1 and the n-th receiver sub 104-N.

In yet alternative embodiment, the relative phase synchronization method for the sub arrangement shown in FIG. 10 can also be performed in the lab environment at different temperatures to derive calibration coefficient for each receiver sub corresponding to particular temperature measurements. In this embodiment, the processing unit 108 can utilize these derived coefficients to synchronize electronics phase delay among subs when processing measurements acquired by the corresponding receiver subs 104.

Using such self-calibration scheme, Equation (1) can be modified as Equation (10):

$$V_{Rx} = Amp_{Target} \times e^{j(2pha_{Tx} + pha_{Rx\text{-}Tx} + pha_{Target})} \qquad (10)$$

where, $pha_{Rx\text{-}Tx}$ is the relative phase delay between transmitter antenna sub and a receiver antenna sub, and $pha_{Tx}$ is the phase delay at the transmitter sub, which can be measured by a dedicated device (such as an antenna current measurement circuit/module) at the transmitter sub mentioned above. Once these phase delay terms are determined, the target signal at the receiver sub can be decoupled using Equation (11):

$$\text{Amp}_{Target} \times e^{j(phaTarget)} = V_{Rx} e^{-j(2phaTx+phaRx-Tx)} \quad (11)$$

Thus, according to embodiments of the present invention, at 1108, the processing unit 108 either receives a measured current signal obtained by a dedicated device at the transmitter 103 and utilizes the received current signal as a normalization factor to remove phase delay or the processing unit 1108 determines the phase delay difference among the plurality of subs 103, 104-1, 104-2, . . . , 104-(N−1), 104-N. At 1110, the processing unit 108 adjusts measurements provided by each receiver sub 104 relatively to each other based on the determinations made at steps 1106 and 1108.

At step 1112, the processing unit 108 can further analyze the adjusted measurement data from the logging tool 105 to detect subsurface layers. For example, the processing unit 108 can identify the boundary locations and other properties of the subsurface layers based on the adjusted resistivity measurements acquired by the tool 105 in the wellbore 102. For example, in some cases, higher resistivity indicates a higher possibility of hydrocarbon accumulation.

In some embodiments, the boundary locations of the subsurface layers are detected based on a distance to bed boundary (DTBB) analysis. For example, the processing unit 108 may determine the distance to the boundary of each subsurface layer from a reference point on the logging tool 105. The reference point on the logging tool 105 can represent, for example, the wellbore depth at or near the axial center of an array of transmitters and receivers in the logging tool 105, or the wellbore depth at another location. The boundary of each subsurface layer can represent, for example, the wellbore depth where the subsurface layers intersect the wellbore 102.

According to embodiments of the present invention, due to substantially stable operating temperatures at certain depth intervals, steps 1106-1110 described above are performed by the processing unit 108 only periodically, preferably, responsive to temperature changes. In other words, as a change in operating temperature exceeds a predefined threshold level within a predefined time period, the processing unit 108 performs steps 1106-1110 to update the sampling frequency of the receiver antennas, determine phase offsets and adjust obtain measurements accordingly. Thus, superior measurement correction is achieved via various processing methods to compensate the effect of non-synchronization among clock systems responsive to temperature changes. This makes it possible to resolve the synchronization issues pursuant to the actual temperature drift. It is noted that once the processing unit 108 resolves clock synchronization issues, the original designed operating frequency ($f_0$) and sampling frequency ($f_s$) values are still used by the processing unit 108 in the DFT calculation since the adjusted receiver sampling frequency effectively synchronizes corresponding receiver clocks to the transmitter clock system.

Figure 12:
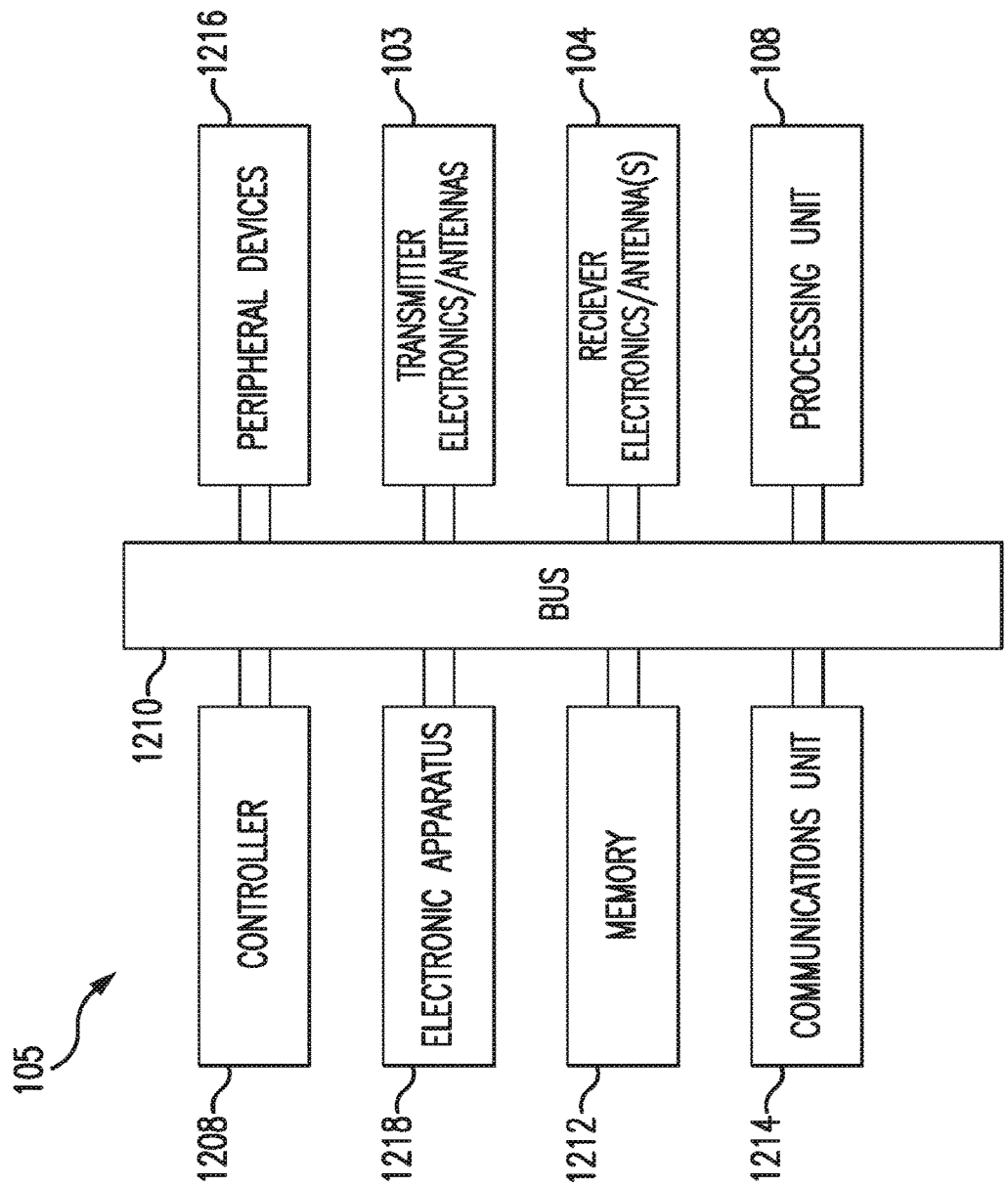
FIG. 12 illustrates a block diagram of an example system having a processing unit and a tool to synchronize measurements, according to various embodiments of the present invention.

FIG. 12 depicts a block diagram of features of an example tool 105 having a processing unit integrated therewith to operatively provide measurements to synchronize real-time signals. Processing unit 108 can be integrated with tool 105 such that processing unit 108 is operable downhole in well 102. The processing unit 108 of tool 105 is operatively connected to an arrangement of transmitter 103 and receivers 104 in which measurement signals can be acquired in response to activating the transmitter 103 in the arrangement, where processing the collected signals from the receivers 104 and transmitter 103 provides formation parameters measurements, for example. The arrangements of transmitter and receivers of tool 105 can be realized in similar or identical manner to arrangements discussed herein.

Tool 105 can also include a controller 1208, a memory 1212, an electronic apparatus 1218, and a communications unit 1214. Controller 1208, memory 1212, and communications unit 1214 can be arranged to control operation of tool 105 in a manner similar or identical to a processing unit discussed herein. Various components of tool 105 can operate together as a processing unit to achieve relative synchronization among the transmitter and receivers in the arrangement and further adjust the received signals to compensate the effect of non-synchronization. Controller 1208, memory 1212, and electronic apparatus 1218 can be realized to activate transmitter antennas and receiver antennas in accordance with measurement procedures and signal processing as described herein. Communications unit 1214 can include downhole communications in a drilling operation. Such downhole communications can include a telemetry system.

Tool 105 can also include a bus 1210, where bus 1210 provides electrical conductivity among the components of tool 105. Bus 1210 can include an address bus, a data bus, and a control bus, each independently configured. Bus 1210 can also use common conductive lines for providing one or more of address, data, or control, the use of which can be regulated by controller 1208. Bus 1210 can be configured such that the components of tool 105 are distributed. Such distribution can be arranged between downhole components such as transmitter and receivers of tool 105 and components that can be disposed on the surface. Alternatively, the components can be co-located such as on one or more collars of a drill string or on a wireline structure.

In various embodiments, peripheral devices 1216 can include displays, additional storage memory, and/or other control devices that may operate in conjunction with controller 1208 and/or memory 1212. In an embodiment, controller 1208 is a processor. Peripheral devices 1216 can be arranged with a display that can be used with instructions stored in memory 1212 to implement a user interface to manage the operation of tool 105. Such a user interface can be operated in conjunction with communications unit 1214 and bus 1210. Various components of tool 105 can be integrated therewith such that processing identical to or similar to the processing schemes discussed with respect to various embodiments herein can be performed downhole in the vicinity of the measurement.

The phrase "processor-readable medium" shall be taken to include any tangible non-transitory device which is capable of storing or encoding a sequence of instructions for execution by the machine and that causes the machine to perform any one of the described and/or claimed methodologies. Such a processor-readable medium includes a machine-readable medium or computer readable medium. The term "non-transitory medium" expressly includes all forms of storage devices, including drives (optical, magnetic, etc.) and all forms of memory devices (e.g., Dynamic Random Access Memory (DRAM), Flash (of all storage designs, including NAND or NOR topologies), Static Random Access Memory (SRAM), Magnetic Random Access Memory (MRAM), phase change memory, etc., as well as all other structures designed to store information of any type for later retrieval.

In an electrical context, use of the phrase "coupled" or "coupling" may refer to either direct coupling, such as conductive electrical coupling (e.g., as in the example of excitation currents conductively coupled into a formation), or indirect coupling (e.g., wireless, reactive, or electromagnetic coupling). In the mechanical context, "coupled" or "coupling" may refer to a direct mechanical connection, or an indirect mechanical connection through one or more other mechanical portions of an example.

Figure 13:
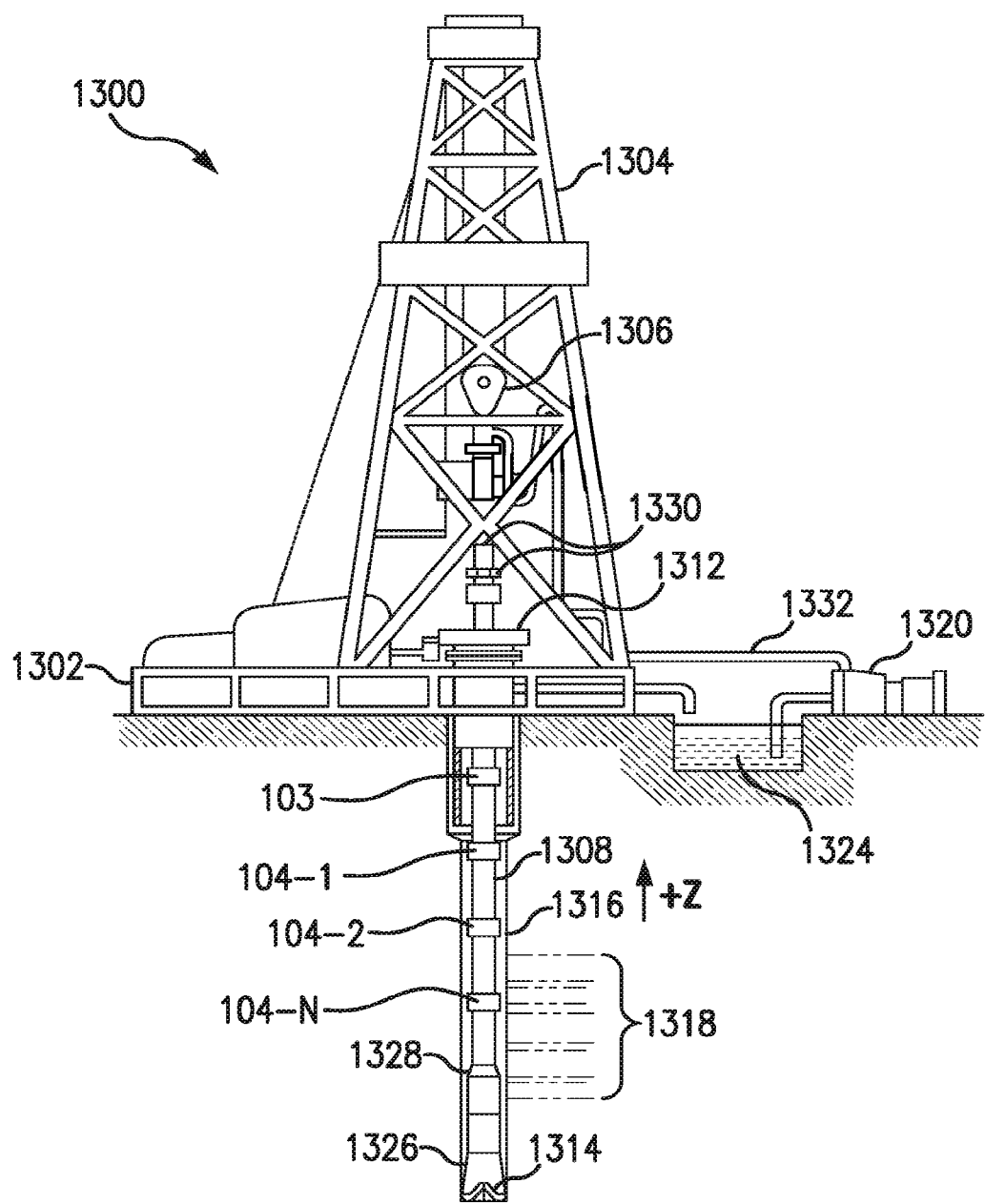
FIG. 13 illustrates generally an example of a drilling apparatus, such as including MWD or LWD capability, in which one or more disclosed embodiments may be used.

FIG. 13 illustrates generally an example of a drilling apparatus 1300, such as including a measure-while-drilling (MWD) or log-while-drilling (LWD) capability. The illustrative example of FIG. 13 may include apparatus such as shown in FIG. 1. A drilling rig or platform 1302 generally includes a derrick 1304 or other supporting structure, such as including or coupled to a hoist 1306. The hoist 1306 may be used for raising or lowering equipment or other apparatus such as drill string 1308. The drill string 1308 may access a borehole 1316, such as through a well head 1312. The lower end of the drill string 1308 may include various apparatus, such as a drill head 1314, to provide the borehole 1316.

A drilling fluid or "mud" may be circulated in the annular region around the drill head 1314 or elsewhere, such as provided to the borehole 1316 through a supply pipe 1332, circulated by a pump 1320, and returning to the surface to be captured in a retention pit 1324 or sump. Various subs or tool assemblies may be located along the drill string 1308, such as a BHA 1326 and a plurality of subs. The plurality of subs may include a transmitter sub 103 and a plurality of axially spaced downhole receiver subs integrated with receivers 104-1, 104-2 . . . 104-(N−1), 104-N to operate in conjunction with processing unit (shown in FIG. 1) to acquire real-time signals generated by the transmitter 103. In various embodiments, the plurality of subs may be powered thru either batteries or a downhole turbine/generator. One conventional approach to downhole electrical power generation includes circulating drilling mud to operate the generator or turbine located downhole. It should be noted that with this approach, when there is no mud flow, the plurality of subs may automatically use the batteries when they are available. In some embodiments the plurality of subs could be powered exclusively by batteries. In yet another embodiment, the plurality of subs are powered exclusively by the downhole turbine/generator and just do not operate when there is no mud flow.

As the BHA 1326 or the plurality of subs 1328 pass through various regions of a formation 1318, information may be obtained. For example, the BHA 1326, or the plurality of subs 1328, may include arrangement such as shown in the example of FIG. 1. As described above the plurality of receivers and transmitter subs 1328 may include wireless telemetry or logging capabilities, or both, such as to transmit or later provide information indicative of a formation resistivity to operators on the surface or for later access in evaluation of formation 1318 properties, including depth. For example, portions 1330 of the apparatus 1300 at the surface may include one or more of wireless telemetry, processor circuitry, or memory facilities, such as to support LWD or MWD operation.

Figure 14:
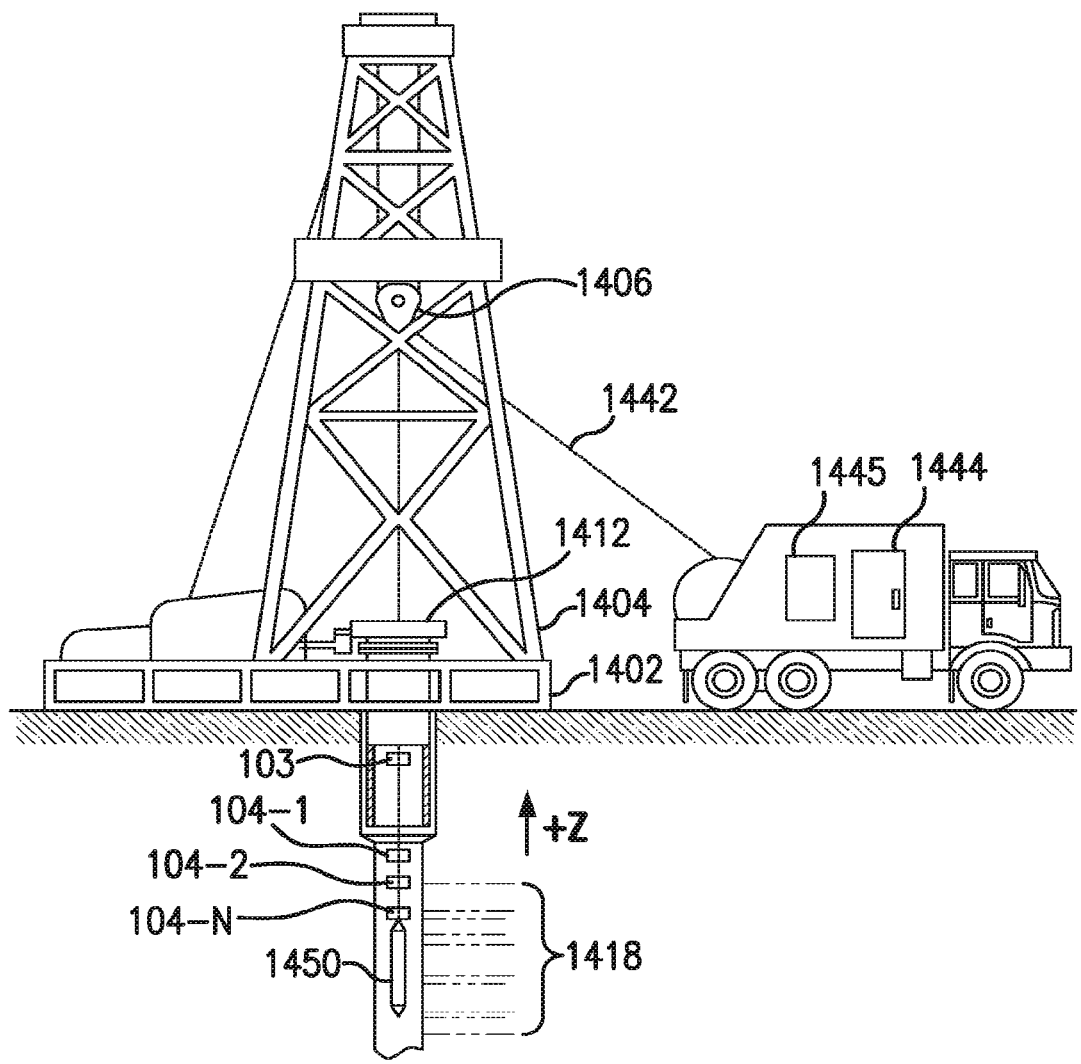
FIG. 14 illustrates generally an example of a wireline logging apparatus in which one or more disclosed embodiments may be used.

FIG. 14 illustrates generally an example of a wireline logging apparatus. The illustrative example of FIG. 14 may include apparatus such as shown in FIG. 1. Similar to the example of FIG. 13, a hoist 1406 may be included as a portion of a platform 1402, such as coupled to a derrick 1404, and used to raise or lower equipment such as a wireline sonde 1450 into or out of a borehole. In this wireline example, a conveyance 1442 may provide a communicative coupling between a logging facility 1444 (e.g., including a processor circuit 1445 or other storage or control circuitry) and the sonde 1450. The conveyance 1442 may be any conveyance means suitable for deploying one or more tool assemblies in a wellbore, including but not limited to tubing, coiled tubing, drill pipe, cable, wireline, slickline and wellbore tractor. Various subs or tool assemblies may be located along the conveyance 1442, such as a plurality of subs. The plurality of subs may include a transmitter sub 103 and a plurality of axially spaced downhole receiver subs integrated with receivers 104-1, 104-2 . . . 104-(N−1), 104-N to operate in conjunction with processing unit 1445 to acquire real-time signals generated by the transmitter 103. In one embodiment, the transmitter 103 and the plurality of receivers 104-1, 104-2 . . . 104-N are configured to communicate with the processing unit 1445 to receive, measure and/or estimate directional and other characteristics of the downhole components, borehole and/or the formation. Such communication may take any desired form, and different transmission media and connections may be used. Examples of connections include wired, fiber optic, acoustic, wireless connections and mud pulse telemetry. If the conveyance 1442 comprises a wireline or cable, power may be provided from the surface to the plurality of subs via one or more of the conductors in the wireline or cable, however, batteries could also be used in this embodiment. In this manner, information about the formation 1418 may be obtained, such as using the above described tool included as at least a portion of the sonde 1450 as discussed in other examples herein.

For purposes of illustration, the examples of FIGS. 13 and 14 show a vertically-oriented borehole configuration. However, the apparatus and techniques described herein may also be used in other borehole configurations, such as a borehole including a horizontal penetration direction, or an oblique borehole configuration, for example. The examples of FIGS. 13 and 14 also generally illustrate land-based examples. But, apparatus and techniques described herein may be used in offshore environments as well, such as for subsea operations. In particular, offshore or subsea operations may include use of wireline or LWD/MWD apparatus and techniques including aspects of the examples herein.

Accordingly, as set forth above, the embodiments disclosed herein may be implemented in a number of ways. In general, in one aspect, the disclosed embodiments are directed to a method for synchronizing signals among transmitters and receivers of a logging tool positioned in a borehole. The method includes, among other steps, the steps of i) acquiring, by a receiver, measurement signals generated from operating a transmitter in the borehole; ii) determining, by a processing unit, an operating frequency of the receiver, the operating frequency of the receiver being different from an operating frequency of the transmitter; iii) determining, by the processing unit, a sampling frequency of the receiver based on the determined operating frequency; iv) determining, by the processing unit, a phase delay of the receiver; and v) adjusting, by the processing unit, the acquired measurement signals based on the determined sampling frequency and the phase delay of the receiver.

In one or more embodiments, the method for determining for synchronizing signals among transmitters and receivers of a logging tool positioned in a borehole may further include any one of the following features individually or any two or more of these features in combination: (a) the operating frequency of the transmitter is fixed and the sampling frequency of the receiver periodically changes due to a drift of a clock source of the receiver as a result of ambient temperature change; (b) the step of processing, by the processing unit, the adjusted measurement signals; (c) the step of processing the adjusted measurement signals further comprising performing Discrete/Fast Fourier Transform (DFT/FFT) calculations; and (d) the steps of determining the operating frequency of the receiver, the sampling frequency of the receiver and the phase delay of the receiver being performed responsive to the temperature change exceeding a predefined threshold.

In general, in another aspect, the disclosed embodiments are directed to an apparatus to measure formation parameters. The apparatus includes, among other things, a tool structure having a downhole transmitter sub with an integrated transmitter and a plurality of axially spaced downhole receiver subs with integrated receivers. The apparatus also includes a control unit to control activation of the transmitter of the tool structure. The apparatus additionally includes a processing unit to process signals received from the receivers in the tool structure. In one aspect, the processing unit is configured to i) collect measurement signals obtained by the tool structure; ii) determine an operating frequency of each receiver, the operating frequency of each receiver being different from an operating frequency of the transmitter; iii) determine a sampling frequency of the receiver based on the determined operating frequency; iv) determine a phase delay of the receiver; and v) adjust the acquired measurement signals based on the determined sampling frequency and the phase delay of the receiver.

In one or more embodiments, the apparatus to measure formation parameters may further include any of the following features individually or any two or more of these features in combination: a) the apparatus being a logging-while-drilling downhole tool and the collected measurement signals being collected logging-while-drilling signals; (b) a communication bus interconnecting the plurality of downhole receiver subs and the downhole transmitter sub; (c) the measurement signals are electromagnetic measurement signals corresponding to depth of investigation from about 60 feet to about 100 feet; (d) the processing unit further configured to process the adjusted measurement signals; (e) the processing unit configured to perform Discrete/Fast Fourier Transform (DFT/FFT) calculations; and (f) a plurality of unsynchronized clocks associated with the transmitter and the plurality of receivers.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the disclosed embodiments as defined in the appended claims.

What is claimed is:

1. A method for synchronizing signals among transmitters and receivers of a logging tool positioned in a borehole, the method comprising:
    acquiring, by a plurality of receivers, measurement signals generated from operating a transmitter at an input frequency in the borehole;
    determining, by a processing unit, an operating frequency drift of each of the plurality of receivers, and a resulting operating frequency of each receiver, the resulting operating frequency being different from an operating frequency of the transmitter;
    determining, by the processing unit, a sampling frequency of each of the plurality of receivers based on the resulting operating frequency of each of the plurality of receivers;
    determining, by the processing unit, a phase delay of each of the plurality of receivers; and
    adjusting, by the processing unit, the acquired measurement signals relative to each other based on the determined sampling frequency and the phase delay of each of the plurality of receivers.

2. The method as recited in claim 1, wherein the operating frequency of the transmitter is fixed.

3. The method as recited in claim 1, wherein determining the phase delay of the receiver comprises determining a phase delay of a current signal generated by the transmitter.

4. The method as recited in claim 1, wherein the sampling frequency of the receiver periodically changes due to a drift of a clock source of the receiver as a result of ambient temperature change.

5. The method as recited in claim 4, wherein the operating frequency of the receiver, the sampling frequency of the receiver and the phase delay of the receiver are determined responsive to the ambient temperature change exceeding a predefined threshold.

6. The method as recited in claim 1, further comprising processing, by the processing unit, the adjusted measurement signals.

7. The method as recited in claim 6, wherein processing the adjusted measurement signals further comprises performing Discrete or Fast Fourier Transform (DFT or FFT) calculations.

8. A system to measure formation parameters, the system comprising:
    a tool structure having a downhole transmitter sub comprising a transmitter and a plurality of axially spaced downhole receiver subs comprising receivers;
    a control unit to control activation of the transmitter of the tool structure; and
    a processing unit to process signals received from the receivers in the tool structure, the processing unit configured to:
    collect measurement signals obtained by a plurality of receivers, the measurement signals generated from operating the transmitter;
    determine an operating frequency of each of the plurality of receivers, the operating frequency of each receiver being different from an operating frequency of the transmitter;
    determine a sampling frequency of each of the plurality of receivers based on the determined operating frequency of each of the plurality of receivers;
    determine a phase delay of each of the plurality of receivers; and
    adjust the acquired measurement signals relative to each other based on the determined sampling frequency and the phase delay of each of the plurality of receivers.

9. The system as recited in claim 8, wherein the tool comprises a logging-while-drilling downhole tool and wherein the collected measurement signals comprise collected logging-while-drilling signals.

10. The system as recited in claim 8, wherein the plurality of downhole receiver subs and the downhole transmitter sub are interconnected by a communication bus.

11. The system as recited in claim 8, wherein the measurement signals comprise electromagnetic measurement signals corresponding to depth of investigation from about 60 feet to about 300 feet.

12. The system as recited in claim 8, wherein a plurality of clocks associated with the transmitter and the plurality of receivers are unsynchronized.

13. The system as recited in claim 8, wherein the processing unit is disposed at the surface of the earth.

14. The system as recited in claim 8, wherein the processing unit configured to process the adjusted measurement signals is further configured to computationally adjust sampling frequency of one or more of the plurality of receivers.

15. The system as recited in claim 8, wherein the processing configured to process the adjusted measurement signals is further configured to computationally synchronize a phase delay of the transmitter and each of the plurality of receivers.

16. The system as recited in claim 8, wherein the processing unit is disposed downhole.

17. The system as recited in claim 8, wherein the processing unit is further configured to process the adjusted measurement signals.

18. The system as recited in claim 17, wherein the processing unit configured to process the adjusted measurement signals is further configured to perform Discrete or Fast Fourier Transform (DFT or FFT).

19. The system as recited in claim 8, wherein the system to measure formation parameters comprises a wireline system.

20. The system as recited in claim 19, wherein the transmitter sub and the plurality of receiver subs communicate with each other via a wireless signal having a frequency ranging from about 1 Hz to about 100 kHz.

* * * * *